Patented Nov. 14, 1944

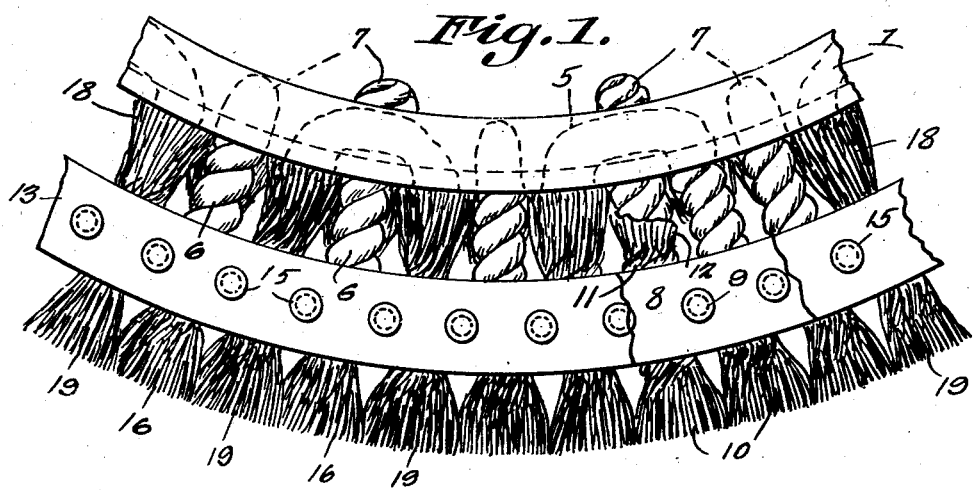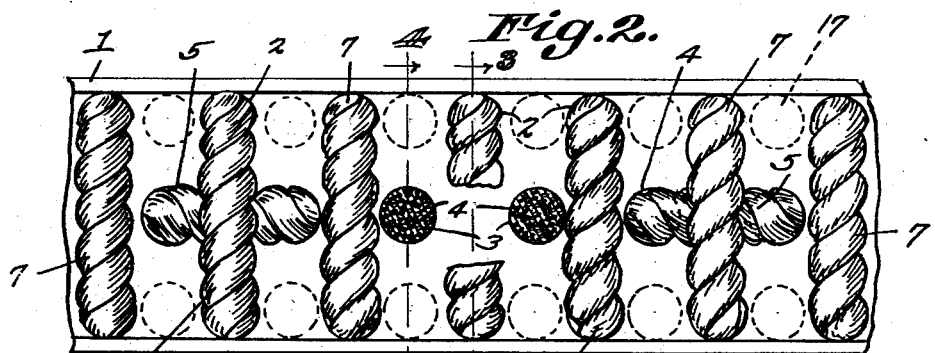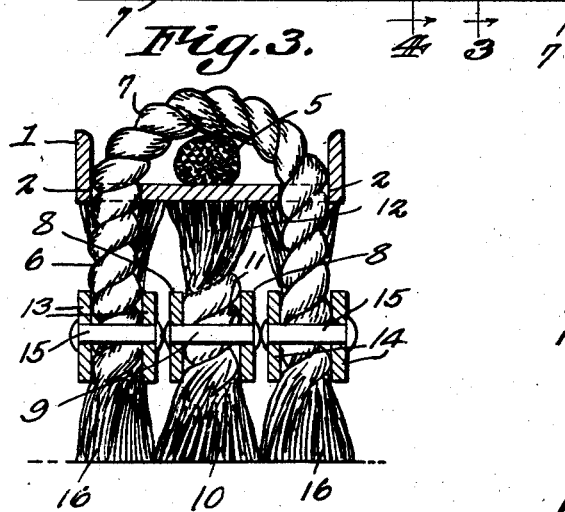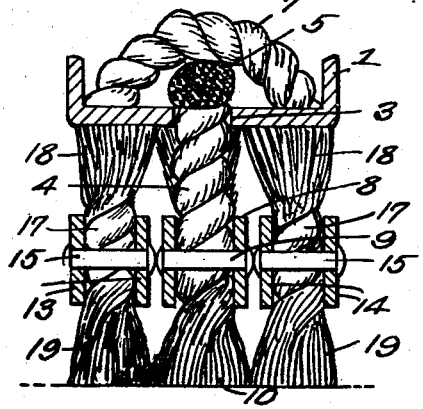

2,362,584

UNITED STATES PATENT OFFICE 2,362,584

WHEEL TIRE OR RIM

Howard Wallace Reid, Alexandria, Va.

Application September 10, 1943, Serial No. 501,867

4 Claims. (Cl. 152—17)

This invention relates to a wheel tire or rim, one of the objects being to provide a tire or rim which can be utilized as an efficient substitute under many conditions for tires of rubber, it being possible to manufacture the same without requiring the use of any objectionable amount of critical material such as rubber, steel, etc.

A further object is to provide a tire or rim having excellent traction properties and also capable of absorbing shocks so that wheels, equipped with the improvements, can travel over rough surfaces without causing excessive jars and vibrations.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of a portion of a tire or rim constructed in accordance with the present invention.

Figure 2 is a plan of a portion of the inner periphery thereof.

Figure 3 is a section on line 3—3, Figure 2.

Figure 4 is a section on line 4—4, Fig. 2.

Referring to the figures by characters of reference, 1 designates an inner ring which can constitute the inner portion of a tire or the rim of a wheel. This inner ring 1, which is of any width desired, is provided adjacent its sides with regularly spaced openings 2 arranged in pairs, the openings of each pair being directly opposite each other and close to the respective sides of the wheel. Another series of regularly spaced openings 3 is provided along the longitudinal center of the rim and these openings are out of line with the pairs of openings 2 as will be noted by referring particularly to Fig. 2.

The openings 3 are arranged in pairs and each pair of these openings has seated in it the end portions 4 of a heavy cord or rope the intermediate portion 5 of which rests on the rim between the openings 3 of said pair.

Seated within the openings 2 of each pair are the end portions 6 of a heavy cord or rope the intermediate portion 7 of which is extended transversely of the rim.

As shown in Fig. 1 alternate intermediate portions 7 are extended between the intermediate portions 5 while the remaining intermediate portions 7 straddle the remaining intermediate portions 5.

The end portions 4 of the central cords or ropes extended through the openings 3 are gripped, adjacent to their free ends, between parallel rings 8, these rings being joined by rivets 9 or the like which extend between the ends 4 and serve to bind the rings tightly on said ends. The free terminals of these ends 4 project desired distances beyond the rings 8 and are frayed or raveled to form brush-like portions 10. Gripped between the rings 8 and located between the ends 4 are short lengths of cord or rope 11 the outer ends of which are flush with the corresponding terminals of the ends 4 and are frayed or raveled to provide brushes while the inner ends, which are likewise frayed or raveled, as indicated at 12, bear against the periphery of the inner ring 1. Thus the ends 4 and the lengths 11 cooperate to provide an annular series of brush-like members, alternate members having brush-like inner ends bearing against the inner ring 1 while all of the members have brush-like outer ends forming a part of the tread of the tire or rim.

The end portions 6 of the transversely extended cords or ropes are gripped between clamping rings 13 and 14 respectively arranged in pairs, the rings 13 being adjacent to one side of the structure while the rings 14 are adjacent to the other side of the structure. These rings 13 and 14 are preferably parallel with the rings 8 and the rings of each pair 13 and 14 are held firmly together by transverse rivets 15 or the like extended between the ends 6. The outer terminals of these ends 6 are raveled or frayed to form brush-like portions 16 which correspond with the brush-like portions 10 heretofore referred to. Gripped between the rings 13 and also between the rings 14 are short lengths of heavy cord or rope 17, both ends of each length being frayed or raveled to provide an inner brush-like portion 18 and an outer brush-like portion 19. The portions 19 are positioned between the brush-like portions 16 and, with the outer brush-like terminals of the ends 4 and of the lengths 11, form a brush-like tread surface extending annularly and throughout the width of the tire or rim. The inner brush-like portions 18 bear against the outer periphery of the inner ring 1 as shown in Fig. 4.

It will be apparent from the foregoing that the brush-like terminals of the various elements provide an efficient anti-skid and cushioning surface which will resist wear. Furthermore those ropes or cords which are looped through the inner ring 1 act to hold the rings 8, 13 and 14 normally concentric with the inner ring 1. However when the rim or tire is subjected to a load, and there is a tendency on the part of the ring 1 to shift its position relative to the rings 8, 13 and 14, this relative movement will be resisted by the end portions 4 and 6 of the looped cords or ropes and also by the brush-like portions 12 and 18 which act to cushion the parts and resist the relative radial movement thereof. The looped ropes or cords tend to stretch where subjected to pulling strains, thereby yieldingly resisting the relative radial movement of the rings.

As a result of the foregoing action a tire or rim such as herein described will serve efficiently as a substitute for ordinary pneumatic or rubber-cushioned tires because it will not only have an efficient wearing surface formed by the outer brush-like ends but will also absorb shocks and vibrations due to the stretch and cushioning effect of those portions of the elements interposed between the inner and the outer rings.

Obviously the size of the rim or tire can be varied and it would be possible to change the relative positions of the flexible elements to meet the requirements.

By utilizing twisted cords or ropes of fibers, as shown, these elements, when used as suspension devices for maintaining the outer rings normally concentric with the inner ring, will aid materially in absorbing shocks and vibrations.

What is claimed is:

1. The combination with an apertured inner ring, of parallel outer rings, a rope or cord looped through the inner ring and having its end portions gripped between the outer rings, thereby to hold the outer rings yieldingly normally in position concentric with the inner ring, lengths of cord or rope gripped between the outer rings and having brush-like inner ends bearing against the inner ring, the outer ends of all of said ropes or cords being frayed or raveled to provide a brush-like tread extending radially from the outer rings.

2. The combination with an apertured inner ring, outer rings normally concentric therewith, brushes carried by the outer rings having frayed or raveled inner ends bearing against the inner ring and frayed or raveled outer ends constituting tread portions, and ropes or cords connecting the inner and outer rings and constituting stretchable means for holding said rings normally concentric, the outer ends of said ropes or cords being frayed or raveled to constitute tread portions.

3. The combination with an apertured inner ring, of parallel outer rings, stretchable fibrous suspension means engaging the inner ring and clamped between the outer rings thereby to hold the inner and outer rings normally concentric, the outer ends of the suspension devices being frayed or raveled to constitute brush-like tread portions, and fibrous elements clamped between the outer rings and having brush-like inner and outer terminals, the inner terminals engaging the inner ring and the outer terminals constituting tread portions.

4. The combination with an inner ring, of parallel outer rings, lengths of cord or rope gripped between the outer rings and having brush-like outer ends cooperating to form a tread, and ropes connecting the inner and outer rings for holding the rings yieldingly normally in concentric positions.

HOWARD W. REID.